United States Patent
Zou et al.

(10) Patent No.: US 8,411,393 B2
(45) Date of Patent: Apr. 2, 2013

(54) ELECTRICAL LAP GUIDES AND METHODS OF USING THE SAME

(75) Inventors: Jie Zou, Eden Prairie, MN (US); Zhongyan Wang, Maple Grove, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 959 days.

(21) Appl. No.: 12/485,981

(22) Filed: Jun. 17, 2009

(65) Prior Publication Data
US 2010/0321814 A1    Dec. 23, 2010

(51) Int. Cl.
G11B 5/31    (2006.01)
B24B 49/00    (2012.01)

(52) U.S. Cl. .................... 360/316; 451/1; 451/5; 451/41

(58) Field of Classification Search ............ 451/1, 5, 451/41; 29/603.14–603.16; 360/316, 110
See application file for complete search history.

(56) References Cited

U.S. PATENT DOCUMENTS

| | | | |
|---|---|---|---|
| 4,675,986 A * | 6/1987 | Yen | 29/603.1 |
| 5,597,340 A | 1/1997 | Church | |
| 6,609,948 B1 | 8/2003 | Fontana | |
| 6,786,803 B2 | 9/2004 | Crawforth | |
| 6,884,148 B1 * | 4/2005 | Dovek et al. | 451/5 |
| 6,935,923 B2 | 8/2005 | Burbank | |
| 7,155,732 B2 | 12/2006 | Rausch | |
| 7,554,767 B1 * | 6/2009 | Hu et al. | 360/125.3 |
| 8,018,678 B1 * | 9/2011 | Zhang et al. | 360/125.03 |
| 8,151,441 B1 * | 4/2012 | Rudy et al. | 29/603.09 |
| 2003/0020467 A1 * | 1/2003 | Kasahara et al. | 324/207.21 |
| 2007/0036040 A1 | 2/2007 | Mihalcea | |

* cited by examiner

*Primary Examiner* — Will J Klimowicz
(74) *Attorney, Agent, or Firm* — Mueting Raasch & Gebhardt PA

(57) ABSTRACT

An electrical lap guide having a first layer, the first layer including a material having a first resistivity, the first layer having first and second contact regions for electrically connecting the electrical lap guide to electrical leads; a second layer, the second layer including a material having a second resistivity, wherein the electrical lapping guide has a lapping axis and a layered axis, the layered axis being perpendicular to the lapping axis, the electrical lapping guide has an air bearing plane, the air bearing plane being perpendicular to the lapping axis, the second layer is disposed adjacent to a portion of the first layer in the direction of the layered axis, and the first layer extends farther in the lapping axis than does the second layer.

17 Claims, 6 Drawing Sheets

US 8,411,393 B2

ELECTRICAL LAP GUIDES AND METHODS OF USING THE SAME

BACKGROUND

Heat assist magnetic recorder (HAMR) is a relatively new type of magnetic recording head. HAMR utilizes a near field transducer (NFT) to heat up a portion of the magnetic recording medium to facilitate switching the magnetization thereof. The NFT of a HAMR is a very important component and can require stringent tolerances in manufacturing to realize the advantages of the technology. The peg length of a NFT is an important dimension and is generally controlled by lapping processes. Because of the need to stringently control the peg lengths of NFTs, there remains a need for improved lapping processes.

BRIEF SUMMARY

Disclosed herein is an electrical lap guide having a first layer, the first layer including a material having a first resistivity, the first layer having first and second contact regions for electrically connecting the electrical lap guide to electrical leads; a second layer, the second layer including a material having a second resistivity, wherein the electrical lapping guide has a lapping axis and a layered axis, the layered axis being perpendicular to the lapping axis, the electrical lapping guide has an air bearing plane, the air bearing plane being perpendicular to the lapping axis, the second layer is disposed adjacent to a portion of the first layer in the direction of the layered axis, and the first layer extends farther in the lapping axis than does the second layer.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Magnetoresistive sensors, as well as other electrical components are conventionally formed by building thin film layer structures on a wafer substrate. The wafer substrates can then be divided into multiple bars that each contains a multitude of components (such as read/write heads for example). The bars can be processed into finished components (such as finished read/write heads for example) by lapping along one longitudinal edge of the bar to precisely define an air bearing surface (ABS) of each component. The bar can then be divided into individual components. Lapping is typically performed as a wet grinding process in which material is removed to reach the ABS. Electronic lap guides or ELGs are used to monitor the lapping. Generally, ELGs are formed in the areas between the electronic components. Each ELG includes an electrically conductive structure whose ends are connected to leads that carry current from a control circuit. The lapping is controlled by monitoring the resistance of the ELG(s) as material is removed in the grinding process.

The present disclosure provides electrical lap guides, which are also referred to as ELGs, for use in lapping processes. Disclosed ELGs can provide greater control and accuracy in lapping processes. The present disclosure also provides methods of using the ELGs disclosed herein, and wafers that include disclosed ELGs.

Figure 1:
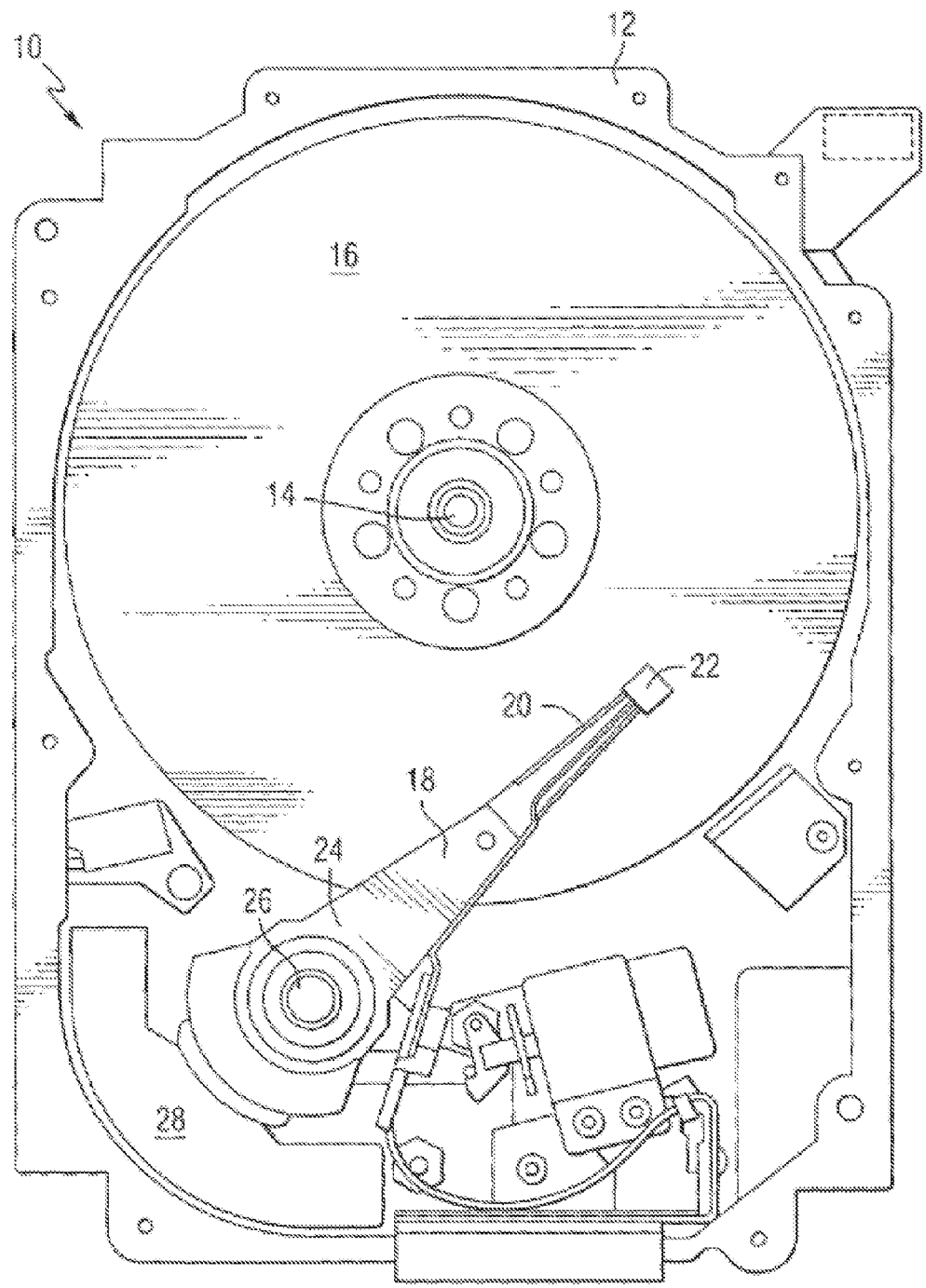
FIG. 1 is a pictorial representation of the mechanical portion of a disc drive.

ELGs disclosed herein can be used to process numerous types of electrical components. One example of an electrical component that can be processed using disclosed ELGs is magnetic recording heads. Referring to the drawings, FIG. 1 is a pictorial representation of a disc drive 10 that can utilize magnetic recording heads. The disc drive 10 includes a housing 12 (with the upper portion removed and the lower portion visible in this view) sized and configured to contain the various components of the disc drive 10. The disc drive 10 includes a spindle motor 14 for rotating at least one data storage medium 16 within the housing 12, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller (not shown in this view).

There are numerous types of magnetic recording heads, one of those that is receiving recent attention is the heat assisted magnetic recording (HAMR) head. A HAMR head can increase storage capacity by directing an electromagnetic wave (e.g. visible, infrared, or ultraviolet light) onto a surface of a data storage medium to raise the temperature of the localized area of the medium to facilitate switching of the magnetization of the area. A transducer, more specifically a near field transducer (NFT) can be used to concentrate the radiation generated from an external source or an internal source, to a localized spot smaller than the diffraction limit.

Figure 2A:
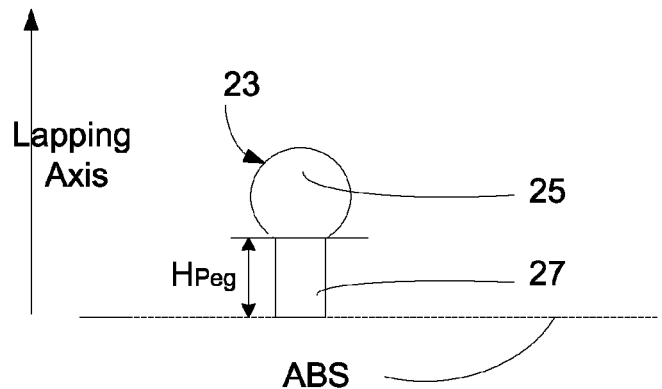
FIGS. 2A and 2B are cross section views of near field transducers (NFTs)

FIG. 2A shows a top down view of an exemplary processed NFT, which is one component of a complete recording head that includes many other elements not shown here. An exemplary recording head includes amongst other components not shown in this view, a near field transducer (NFT) 23. The NFT 23 includes a disk 25 and a peg 27. The disk 25 functions to absorb the incoming electromagnetic waves that are generated above it (not shown) and the peg 27 functions to focus and emit the electromagnetic waves from the recording head, thereby heating the magnetic recording media below it (also not shown). The height ($H_{peg}$) of the peg 27 across the air bearing surface ABS of the recording head can contribute greatly to the function of the NFT. Generally, the peg length $H_{peg}$ can range from about 5 nanometers (nm) to about 100 nm. In embodiments, the peg length $H_{peg}$ can range from about 10 nm to about 40 nm. The height $H_{peg}$ of the peg 27 is generally determined by lapping the head or a larger structure containing the head (such as a wafer) along the lapping axis (shown by the arrow in FIG. 2A) in the direction of the arrow, which can be referred to as the lapping direction.

The exemplary design for the NFT shown here is called the "lollipop" design. In embodiments, NFTs having a lollipop design can have a peg height ($H_{peg}$) across the ABS to within a tolerance of about +5 nm. Other exemplary designs for a NFT include the coupled nano rod (CNR), triangle with a beak, and bowtie antenna, for example. Generally, all NFT designs have a dimension similar to $H_{peg}$ that must have a similarly tight tolerance. In embodiments, the accuracy of the peg height $H_{peg}$ across the ABS can be determined by the accuracy of the lapping process.

Figure 2B:
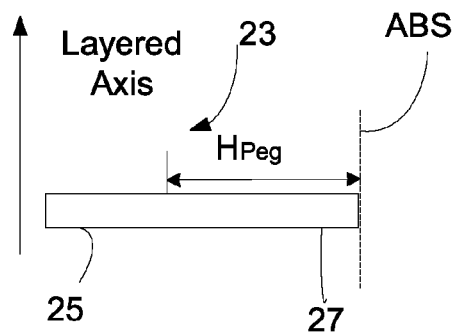

FIG. 2B depicts a cross section view of an exemplary pre-processed NFT 23. This particular view is a cross sectional view along the layered axis, which is perpendicular to the lapping axis. The NFT 23 depicted in FIG. 2B could be considered pre-processed because the peg 27 extends beyond the ABS.

Figure 3A:
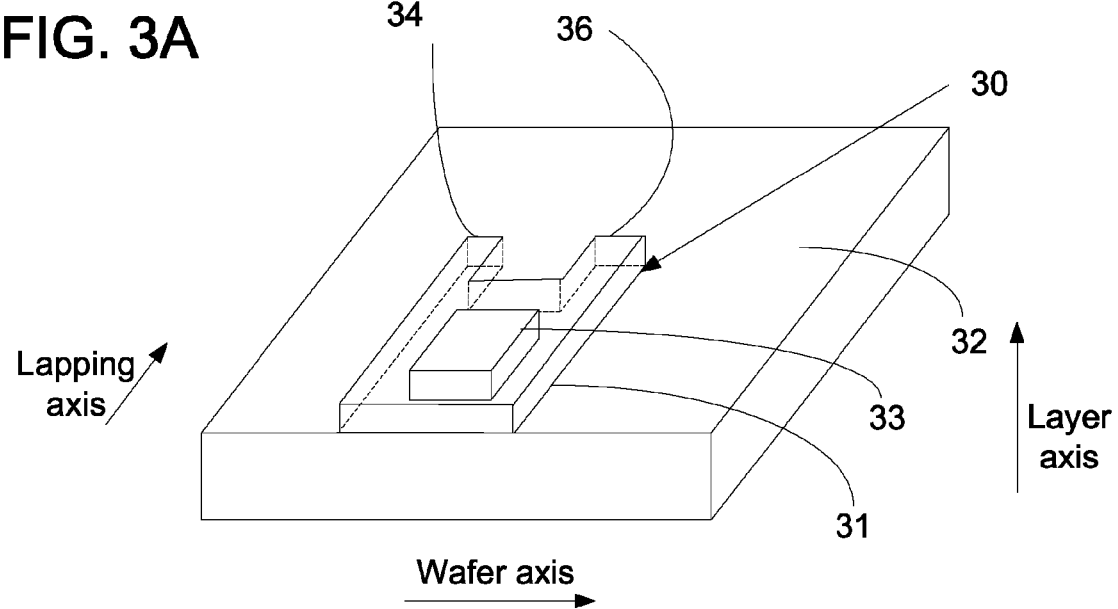
FIGS. 3A, 3B, and 3C are perspective (FIG. 3A), and cross sectional views (FIGS. 3B and 3C) of electrical lap guides (ELGs) as disclosed herein.

FIG. 3A depicts a perspective view of an exemplary ELG that has been formed on a wafer. The ELG 30 can be formed on or in a wafer 32. The ELG generally has or exists on three axes. The three axes are generally orthogonal to one another. The three axes are designated the same throughout this disclosure and will be referred to as the lapping axis (or the x-axis), the layer axis (or the z-axis) and the wafer axis (or the y-axis). With respect to the lapping axis, the arrow designated as the lapping axis in FIG. 3A indicates the lapping direction. With respect to the layer axis, the arrow designated as the layer axis in FIG. 3A indicates up in the layer direction (and the opposite direction would indicate down). It will be understood that such definitions are for convenience only and should in no way be considered to limit the scope of the present disclosure.

An ELG can generally include a first layer 31 and a second layer 33. Generally, the second layer 33 is disposed adjacent to, directly adjacent to, or on top of a portion of the first layer 31 in the direction of the layered axis. The first layer 31 has a longer dimension in the direction of the lapping axis. In an embodiment, the first layer 31 extends farther along the lapping axis than the second layer 33 does. In an embodiment, the first layer 31 extends farther in the lapping direction than the second layer 33 does.

The first layer 31 can include first and second contact regions 34 and 36. The first and second contact regions 34 and 36 can be a contiguous part of the first layer 31, as exemplified in FIG. 3A, or can be electrically connected to the first layer 31. Generally, the first and second contact regions 34 and 36 are configured to and/or function to electrically connect the ELG to electrical leads. As exemplified by FIG. 3A, the first and second contact regions 34 and 36 can extend farther along the lapping axis than does the remainder of the first layer 31.

Generally, the first layer 31 can be made of a first material; and the second layer 33 can be made of a second material. The first material and the second material are not the same material. The first material is generally a conductive material and has a first resistivity; and the second material is also generally a conductive material and has a second resistivity. The first resistivity can be higher than that of the second resistivity.

In embodiments, the first material can include conductive materials having a resistivity of greater than or equal to about $5 \times 10^{-8}$ Ωm. In embodiments, the first material can be any conductive materials with resistivity of greater than $10^{-7}$ Ωm, including materials such as chromium (Cr), tantalum (Ta), tungsten (W), titanium (Ti), vanadium (V), ruthenium (Ru), rhodium (Rh), or combinations thereof. In embodiments, the first material can be chromium (Cr). In embodiments, the second material can include conductive materials having a resistivity of less than or equal to about $10^{-7}$ ΩM. In embodiments, the second material can include materials such as gold (Au), silver (Ag), copper (Cu), or combinations thereof. In embodiments, the second material can be gold (Au). In embodiments, the first material can be chromium (Cr) and the second material can be gold (Au).

Figure 3B:
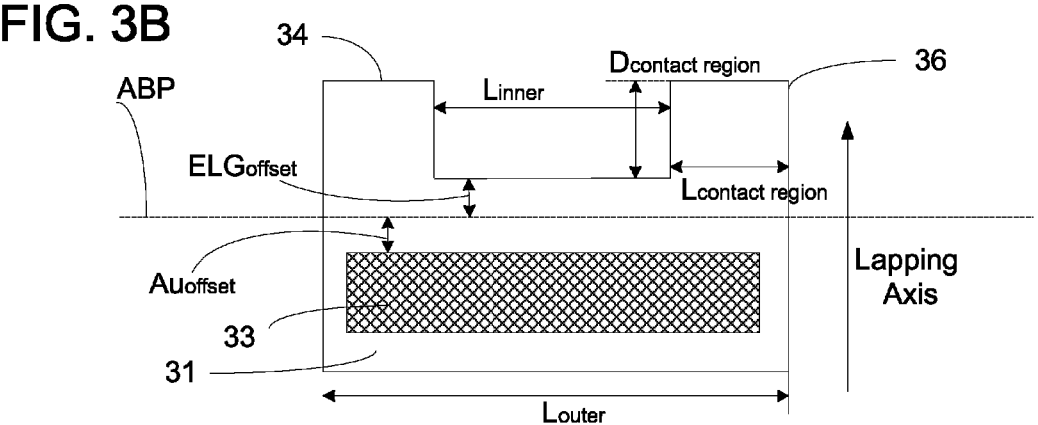

FIG. 3B depicts a top down (looking down from the layer axis) view of an embodiment of an ELG. The depicted embodiment in FIG. 3B shows the air bearing plane (ABP) that bisects the ELG. The ABP is perpendicular to the lapping axis. The ABP is a plane that bisects the ELG and once the ELG (as well as other structures on the wafer) has been processed, the ABP will become the air bearing surface (also referred to as the ABS) of the wafer, and ultimately the read head.

As seen in the embodiment in FIG. 3B, the second layer 33 does not contact the ABP. The distance between the ABP and the back edge of the second layer 33 is shown by the two headed arrow designated $Au_{offset}$. The distance from the back edge of the second layer 33 and the ABP generally determines the final distance that the lapping process must remove. In embodiments, the $Au_{offset}$ can be from about 0 nm to about 1000 nm. In embodiments, the $Au_{offset}$ can be from about 0 nm to about 200 nm. In embodiments, the $Au_{offset}$ can be from about 120 nm to about 200 nm.

Also as seen in the embodiment depicted in FIG. 3B, the ABP bisects the ELG through the first layer 33. The distance from the ABP to the closest portion of the first layer 31 (for example, not the first and second contact regions 34 and 36) is shown by the two headed arrow designated $ELG_{offset}$. The distance from the ABP to the closest portion of the first layer 31 generally determines the width of the resistor in the ELG. In embodiments, the $ELG_{offset}$ can be from about 50 nm to about 1000 nm. In embodiments, the $ELG_{offset}$ can be from about 200 nm to about 500 nm. In embodiments, the $ELG_{offset}$ can be about 300 nm.

FIG. 3B also depicts other dimensions of the ELG. The length of the inner portion of the ELG, or stated another way the distance between the first contact region 34 and the second contact region 36 is shown by the two headed arrow designated $L_{inner}$. The distance between the first contact region 34 and the second contact region 36 generally determines the length of the resistor in the ELG. In embodiments, the $L_{inner}$ can be from about 5 μm to about 900 μm. In embodiments, the $L_{inner}$ can be from about 20 μm to about 100 μm. In embodiments, the $L_{inner}$ can be about 45 μm. The length of the entire ELG in the wafer axis is shown by the two headed arrow designated $L_{outer}$. $(L_{outer}-L_{inner})/2$ generally determines the width of the leads. In embodiments, the $L_{outer}$ can be from about 10 μm to about 1000 μm. In embodiments, the $L_{outer}$ can be from about 50 μm to about 200 μm. In embodiments, the $L_{outer}$ can be about 105 μm.

ELGs as disclosed herein also generally include a first contact region 34 and a second contact region 36. The first and second contact region 34 and 36 function to allow electrical contact to another device or to a lead. Once the first and second contact regions 34 and 36 are connected, via leads for example, to a control circuit, the resistance across the ELG can be monitored. As discussed above, the resistance of the ELG can be monitored in order to control the lapping process. The first and second contact regions 34 and 36 can either be extensions of the first layer 31 or can be separate structures that are formed and electrically connected (via the two materials for example) to the first layer 31. In embodiments, the first and second contact regions 34 and 36 are extensions of the first layer 31 that extend farther in the lapping direction. This can allow for connection to the ELG throughout the lapping process, because the first and second contact regions 34 and 36 extend far enough in the lapping direction that they will not be lapped away in the lapping process.

The ELG depicted in FIG. 3B shows first and second contact regions 34 and 36. The first and second contact regions 34 and 36 can generally be described by their length in the wafer axis, which is designated by the arrow labeled $L_{contact\ region}$. The $L_{contact\ region}$ can generally be from about 5 μm to about 50 μm. In embodiments, the $L_{contact\ region}$ can be from about 0.1 μm to about 500 μm. In embodiments, the $L_{contact\ region}$ can be about 30 μm. The depth of the first and second contact regions 34 and 36 is designated by the arrow labeled $D_{contact\ region}$. The $D_{contact\ region}$ can generally be from about 1 μm to about 1000 μm. In embodiments, the $D_{contact\ region}$ can be from about 5 μm to about 100 μm. In embodiments, the $D_{contact\ region}$ can be about 10 μm.

Figure 3C:
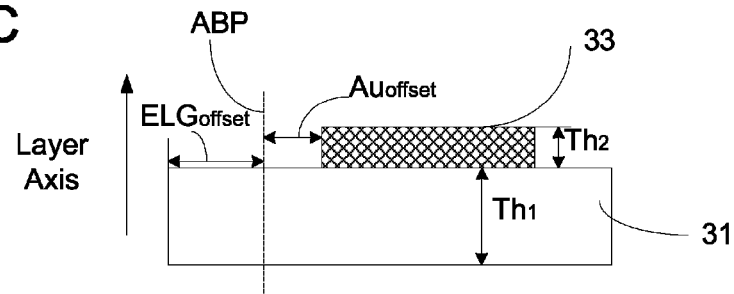

FIG. 3C depicts a cross section of an exemplary ELG taken through the layer axis. The $ELG_{offset}$ and the $Au_{offset}$ and their relationship to the ABP can be seen in this figure. The first layer 31 and the second layer 33 can also be seen in this figure. The first layer 31 and the second layer 33 can also be described by their thicknesses. The thickness of the first layer 31 is designated as $Th_1$; and the thickness of the second layer 33 is designated as $Th_2$. The thickness of the first layer 31 generally determines the absolute value of the resistance of the ELG; and can be at least partially determined by the thicknesses of other features in the wafer, especially those that may be formed in the same step as the ELG. In embodiments, the first layer 31 can have a thickness, $Th_1$ of nanometers. In embodiments, the first layer 31 can have a thickness, $Th_1$ from about 5 nm to about 1000 nm. In embodiments, the first layer 31 can have a thickness, $Th_1$ from about 10 nm to about 100 nm. In embodiments, the first layer 31 can have a thickness, $Th_1$ of about 26 nm. The thickness of the second layer 33 generally determines the difference in the resistance of the ELG when the second layer 33 is present in comparison to when the second layer 33 is not present. In embodiments, the second layer 33 can have thickness, $Th_2$ of nanometers. In embodiments, the second layer 33 can have thickness $Th_2$ from about 5 nm to about 1000 nm. In embodiments, the second layer 33 can have thickness $Th_2$ from about 10 nm to about 300 nm. In embodiments, the second layer 33 can have thickness $Th_2$ of about 100 nm.

ELGs as disclosed herein can be associated with one or more pre-processed features. Exemplary features can include, but are not limited to, components of magnetic read/write heads. In embodiments, ELGs as disclosed herein can be utilized in association with near field transducers (NFTs) for heat assist magnetic recording (HAMR) heads. In embodiments, at least one ELG and at least one feature can both be associated with, formed in, formed on, or some combination thereof a wafer. Features, ELGs or both can be formed on a wafer, in a wafer, or a combination thereof. In embodiments, features, ELGs or both can be formed on a wafer. A wafer is generally a thin slice of semiconductor material, such as silicon crystal for example, or a thin slice of composite material, such as aluminum titanium carbide (AlTiC), which serves as the substrate for electronic devices and other such structures.

Figure 4A:
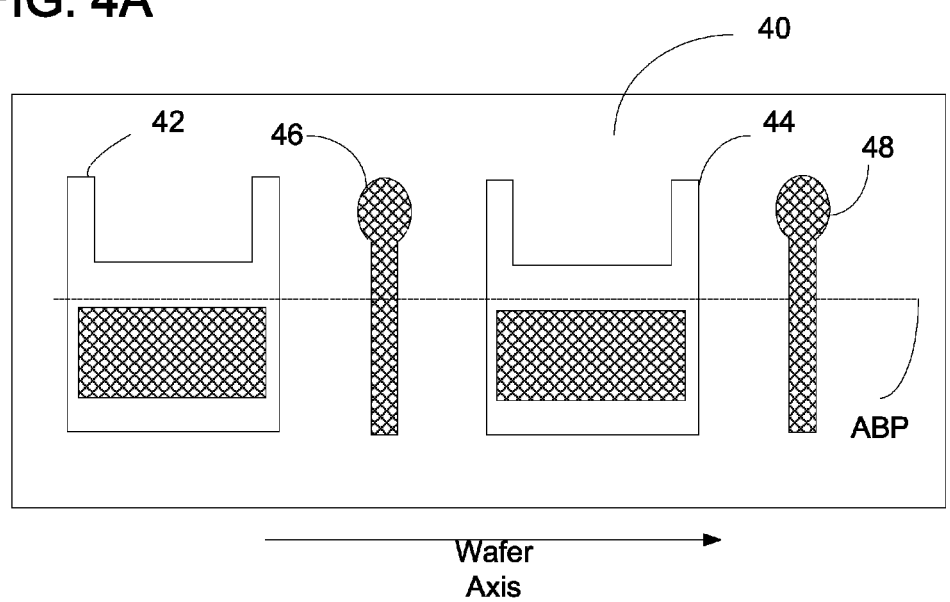
FIGS. 4A and 4B are cross sectional (FIG. 4A) and perspective views (FIG. 4B) of wafers that include ELGs as disclosed herein.

At least one ELG and at least one pre-processed feature can be included in a pre-processed wafer. The phrase "pre-processed", as used herein, generally refers to a wafer, a feature, or a combination thereof, that have not yet been subjected to lapping. In embodiments, a pre-processed wafer can include at least two ELGs and at least one pre-processed feature. In embodiments, the at least one pre-processed feature can be disposed between the at least two ELGs along the wafer axis. FIG. 4A depicts a first and second ELG 42 and 44; and a first and second pre-processed NFT 46 and 48 disposed on a wafer 40. The wafer 40 can extend in all directions even though it is depicted as having a rectangular shape. As seen in this figure, the first and second ELGs 42 and 44 flank the first pre-processed NFT 46, or stated another way, the first pre-processed NFT 46 is disposed between the first and second ELGs 42 and 44 along the wafer axis. The second pre-processed NFT 48 is flanked by the second ELG 44 and another ELG (not shown in this figure). The wafer 40 is also bisected by the air bearing plane, ABP, which is parallel to the wafer axis and perpendicular to the lapping axis, and also bisects the ELGs and pre-processed features disposed thereon.

Figure 4B:
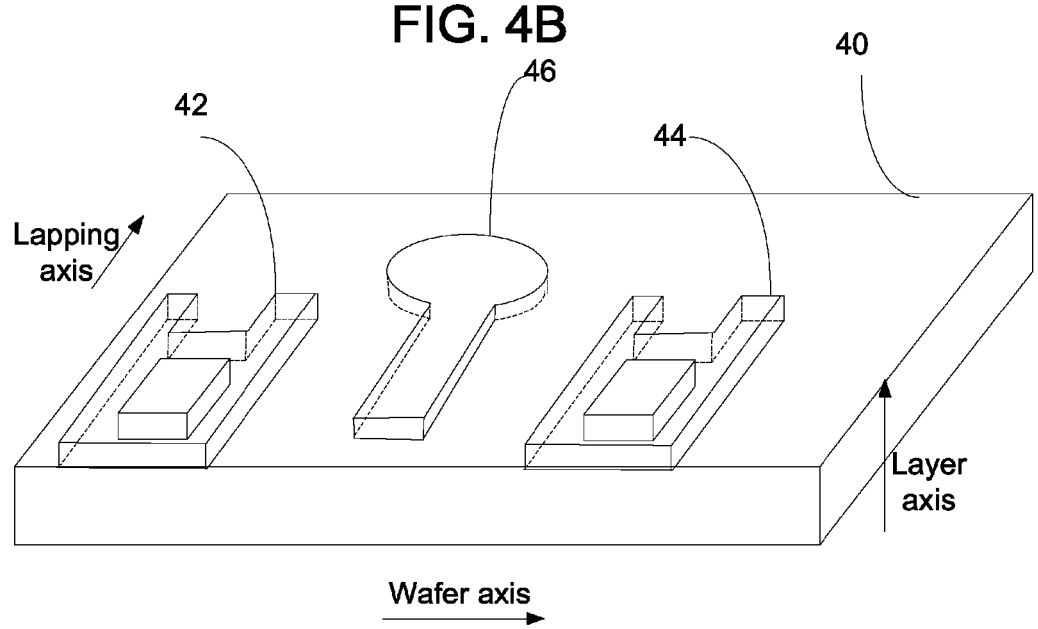

FIG. 4B shows a perspective view of another exemplary wafer that includes a first ELG 42, a first pre-processed NFT 46 and a second ELG 44. As seen there, the three axes that were previously designated, the lapping axis, the layer axis, and the wafer axis can be utilized with respect to the wafer as well as the ELGs and the pre-processed features. As seen there, the first pre-processed NFT 46 is disposed between the first ELG 42 and the second ELG 44 along the wafer axis.

The material making up the pre-processed feature can vary depending on the type of feature that is being made. In embodiments, the materials of the pre-processed feature and the second layer of the ELG are chosen so that they are the same material. This can be advantageous because they can be deposited and patterned in the same step. This can not only make processing the wafers easier and likely more economical, but it can also serve to automatically align the second layer of the ELG with the pre-processed feature. This can be an advantage because a portion of the error that can be involved in using other methods and types of ELGs can be due at least in part to the level of accuracy to which two separately deposited and/or patterned structures can be controlled. In embodiments, therefore, depositing and patterning the material for the pre-processed feature and the second layer of the ELG simultaneously can provide advantages. In embodiments, the pre-processed feature and the second layer of the ELG can both be made of gold (Au), silver (Ag), or copper (Cu).

An ELG as described herein overcomes many problems associated with previously utilized ELGs having only one layer. For example, the pre-processed feature, such as an NFT for example, can require materials having a very low resistivity, such as gold (Au), silver (Ag), or copper (Cu) for example. It can be advantageous (from a processing stand point) to deposit the ELG and the pre-processed feature at the same time; when the material has to be a low resistivity material, the ELG therefore will also have a relatively low resistance. This can increase the error in the lapping process due to parasitic resistance of the connects and contacts. Avoiding these errors by selecting different materials for the one layer ELG and the pre-processed feature prohibits depositing and patterning the ELG and the pre-processed feature simultaneously. This not only adds processing complexity to the process but also results in alignment and other process errors due to having two separately deposited and/or patterned structures. Disclosed ELGs avoid the above noted problems of one layer ELGs.

Figure 5A:
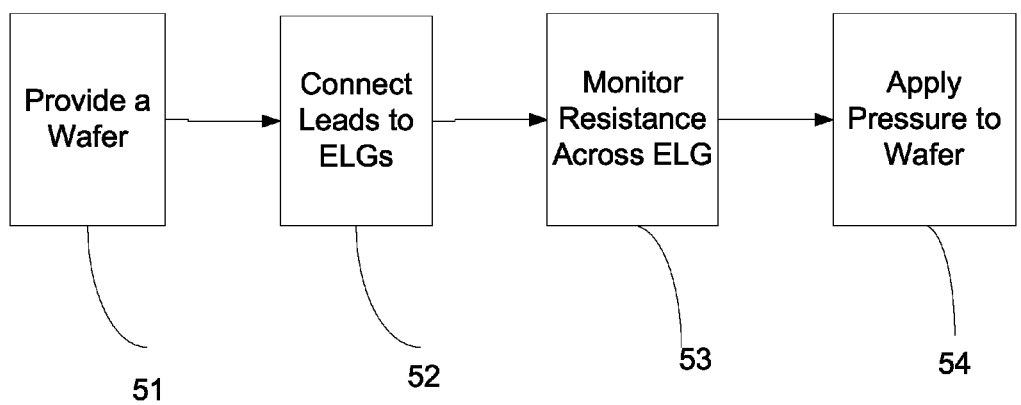
FIGS. 5A and 5B are flow diagrams demonstrating exemplary methods disclosed herein.

Also disclosed herein are methods of processing wafers. Generally, such methods include lapping methods. Lapping methods can include steps such as those depicted in FIG. 5A. The method depicted in FIG. 5A includes step 51, providing a wafer. The step of providing a wafer can be accomplished by forming such a wafer or obtaining a pre-formed wafer. Generally, the wafer includes at least one pre-processed feature and at least one ELG as disclosed above. In embodiments, the wafer can include at least one pre-processed feature and at least two ELGs, where the at least one pre-processed feature is disposed between the at least two ELGs. As discussed above, the ELGs include first and second contact regions for electrically connecting the ELG to leads. Step 52 of this exemplary method includes connecting leads to the first and second contact regions of the ELGs. The leads can then in turn be connected to a control circuit. Step 53 of this exemplary method includes monitoring the resistance across the ELG. The leads and control circuits are used to monitor the resistance across the ELG which can be used to monitor the lapping process. Step 54 of this exemplary method includes applying pressure with a lapping tool to the surface of the wafer in order to remove a portion of the wafer and the components (features and ELGs) included thereon.

Figure 5B:
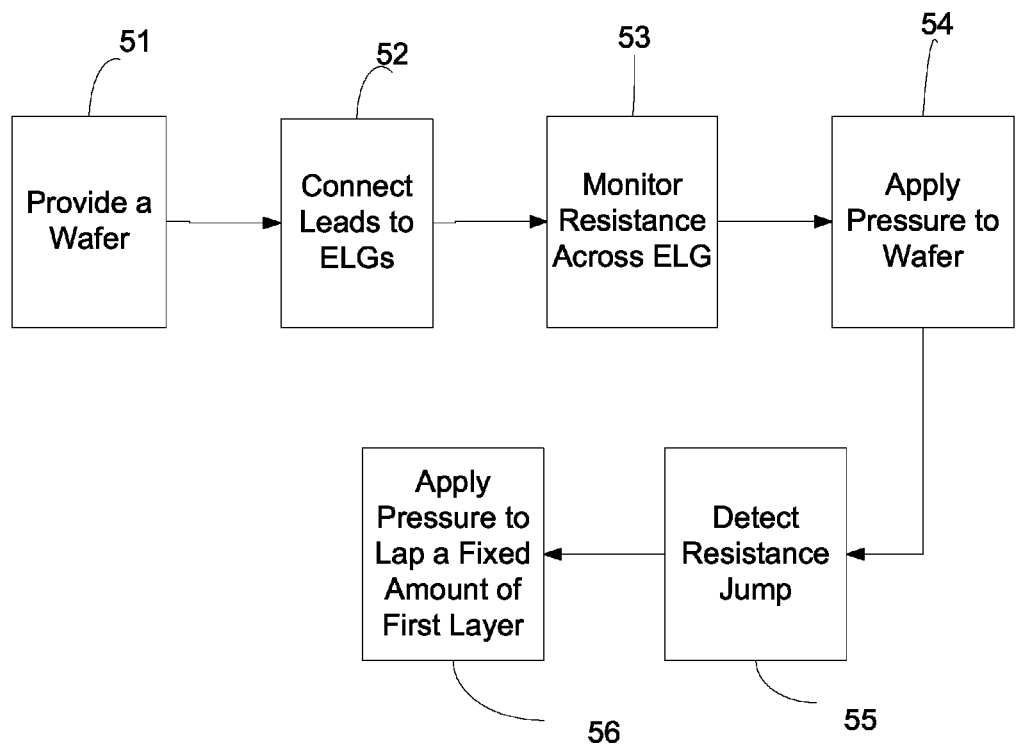

Another exemplary method disclosed herein is exemplified in FIG. 5B, the method in FIG. 5B includes the steps discussed above as well as additional steps. In this embodiment, while pressure is being applied to the wafer, step 54, the resistance is still being monitored, step 53. At the point when almost the entire second layer of the ELG has been lapped away, a substantial increase in the resistance will be detected. This is designated as step 55, detection of resistance jump. In embodiments, a substantial increase can be a resistance that is greater than about 100% of what it was previously. After the resistance jump has been detected, pressure can still be applied to the wafer, or can be applied to the wafer again (if the application of pressure was ceased). This application of pressure however, as opposed to the first application of pressure is designed to lap a fixed amount of the first layer, as designated by step 56.

Such a two step lapping can be advantageous because of the significant jump in resistance provided at the point when the second layer is almost entirely lapped away. If $Au_{offset}$ is designed to be zero, this point can be used as the end of the lapping process. If $Au_{offset}$ is designed to be greater than zero, this point can be used as the starting point for lapping based on the change in resistance of the first layer. This can provide greater flexibility for lapping, because the same pre-processed wafer can be utilized to achieve various lapping targets.

Figure 6:
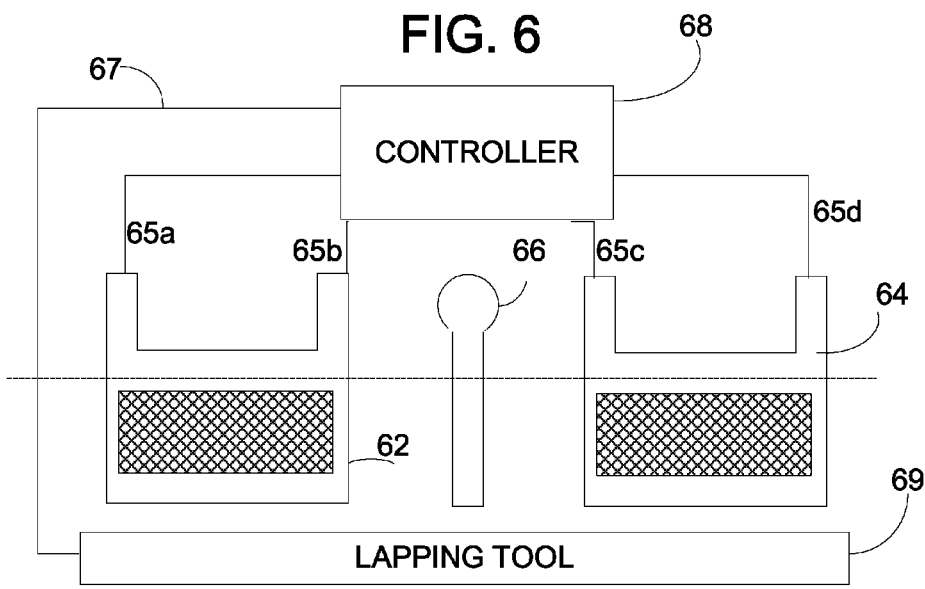
FIG. 6 is a pictorial representation of an exemplary system that can be used to carry out methods disclosed herein.

FIG. 6 schematically depicts an exemplary system that can be used to carry out methods disclosed herein. The system in FIG. 6 includes a wafer (not depicted in FIG. 6) that includes first and second ELGs 62 and 64, and a pre-processed feature 66 disposed there between. The contact regions of the first and second ELGS 62 and 64 are connected via ELG leads 65a through 65d to a controller 68. The controller 68 includes components that allow it to monitor the resistance across the ELGs. The controller 68 also includes components that allow it to control the lapping tool 69 via the lapping tool lead 67.

Generally, the controller 68 can include within its programming an algorithm. As the lapping tool 69 laps the wafer, the resistances of the ELGs change, which is sensed by the controller 68. If the controller 68 senses a higher resistance, for instance, from the first ELG 62 as compared to the second ELG 64, this can indicate that the left side of the wafer is being lapped more than the right side, which will then cause the controller 68 to operate one or more pistons (not shown) of the lapping tool 69 to apply more pressure to the right side of the lapping tool 69 as compared to the left side until the resistances form the left and right ELGs are equalized. When the resistance of the ELGs jump, meaning that the second layer has been almost entirely lapped away, the controller 68 can modify the control of the lapping tool 69 in order to now lap a predetermined amount of the first layer in order to expose the air bearing surface of the wafer (and the components included on the wafer).

Figure 7:
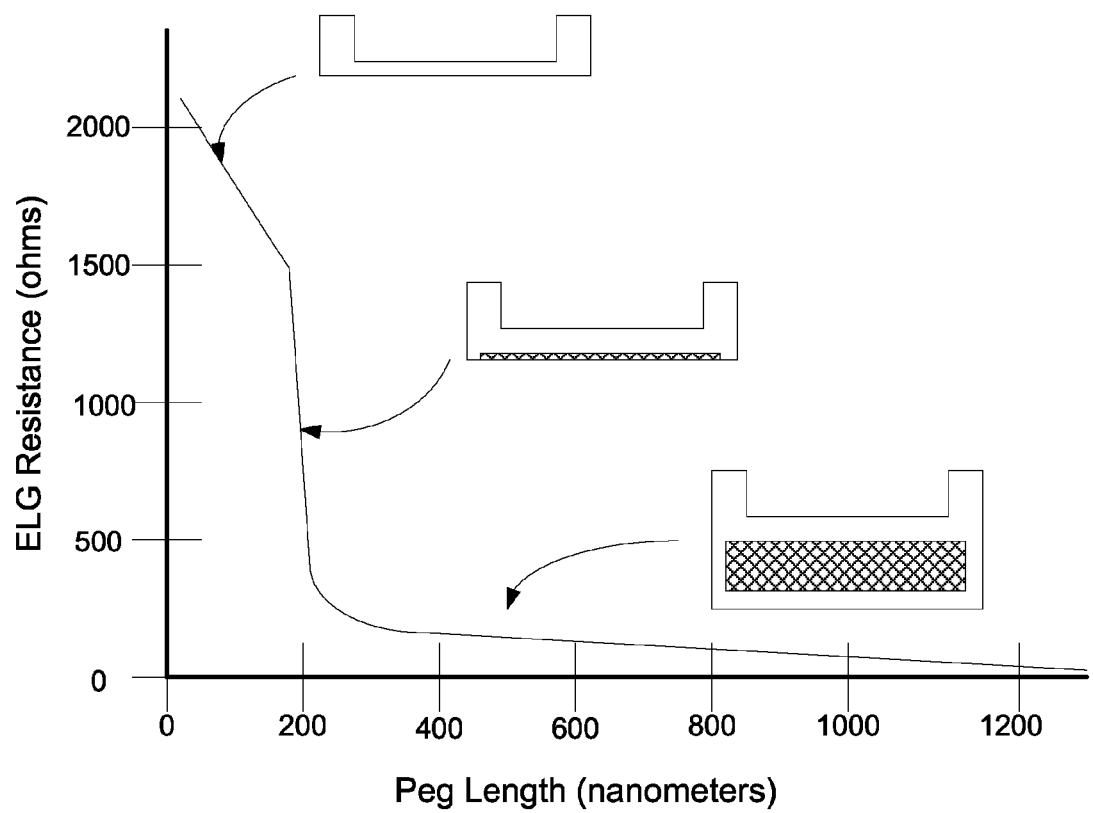
FIG. 7 is a simulated resistance versus peg length graph for an ELG as disclosed herein.

FIG. 7 depicts a simulated resistance versus peg length of the NFT curve for a wafer lapped using methods disclosed herein. As seen in FIG. 7, as lapping begins (on the right side of the graph, with the highest peg length values), the resistance is relatively low and does not show a substantial change. This is reflective of the second layer being slowly lapped away, as long as some of the second layer remains, the current can navigate this path, which is the least resistive. Once the second layer has been lapped away, the resistance jumps significantly, as seen from the slope of the curve from about 200 nm to about 130 nm, which changes the resistance from less than about 100 ohms to about 1500 ohms. The last section of the graph depicts the lap off of a fixed amount of the first layer to hit the target peg length of the NFT. The simulation depicted in FIG. 7 assumed the following: first layer 26 nm of chromium (Cr) having a sheet resistance of about 13.5 ohm/cm$^2$; second layer 100 nm of gold (Au) having a resistance of 3 µohm/cm$^2$; $L_{outer}$=106 µm; $L_{inner}$=46 µm; $L_{contact\ region}$=30 µm; $D_{contact\ region}$=10 µm; $ELG_{offset}$=300 nm; and $Au_{offset}$=150 nm.

Thus, embodiments of ELECTRICAL LAP GUIDES AND METHODS OF USING THE SAME are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present disclosure is limited only by the claims that follow.

What is claimed is:

1. An electrical lap guide comprising:
a first layer, the first layer comprising a first material having a first resistivity, the first layer having first and second contact regions configured to electrically connect the electrical lap guide to electrical leads;
a second layer, the second layer comprising a second material having a second resistivity,
wherein the electrical lap guide has a lapping axis and a layered axis, the layered axis being perpendicular to the lapping axis,
the electrical lap guide has an air bearing plane, the air bearing plane being perpendicular to the lapping axis,
the second layer is disposed adjacent to a portion of the first layer in the direction of the layered axis,
the first layer extends farther in the lapping axis than does the second layer, and
the second layer does not contact the air bearing plane of the electrical lap guide.

2. The electrical lap guide according to claim 1, wherein the first resistivity is higher than the second resistivity.

3. The electrical lap guide according to claim 1, wherein the first material is chosen from the group consisting of: chromium (Cr), tantalum (Ta), tungsten (W), titanium (Ti), vanadium (V), ruthenium (Ru), rhodium (Rh), or combinations thereof.

4. The electrical lap guide according to claim 1, wherein the second material is chosen from the group consisting of: gold (Au), silver (Ag), copper (Cu), or combinations thereof.

5. The electrical lap guide according to claim 1, wherein the first material is chromium (Cr), and the second material is gold (Au).

6. The electrical lap guide according to claim 1, wherein the second layer is less than about 200 nm away from the air bearing plane.

7. The electrical lap guide according to claim 1, wherein the second layer is from about 120 nm to about 200 nm away from the air bearing plane.

8. A pre-processed wafer having
a lapping axis, a layered axis, and a wafer axis the three axes being orthogonal to one another; and an air bearing plane, the air bearing plane being parallel to the wafer axis and perpendicular to the lapping axis and the air bearing plane bisecting the pre-processed wafer, the pre-processed wafer comprising:
at least one pre-processed feature;
at least two electrical lap guides, each of the electrical lap guides comprising:
a first layer, the first layer comprising a first material having a first resistivity, the first layer having first and second contact regions for electrically connecting the electrical lap guide to electrical leads;
a second layer, the second layer comprising a second material having a second resistivity,
the second layer is disposed adjacent to a portion of the first layer in the direction of the layered axis, and
the first layer extends farther in the lapping axis than does the second layer,
wherein the at least one pre-processed feature is disposed between the at least two electrical lap guides along the wafer axis, and
wherein the pre-processed feature comprises the same material as the second layer.

9. The pre-processed wafer according to claim 8, wherein the first resistivity is higher than the second resistivity.

10. The pre-processed wafer according to claim 8, wherein the first material is chosen from the group consisting of: chromium (Cr), tantalum (Ta), tungsten (W), titanium (Ti), vanadium (V), ruthenium (Ru), rhodium (Rh), or combinations thereof.

11. The pre-processed wafer according to claim 8, wherein the second material is chosen from the group consisting of: gold (Au), silver (Ag), copper (Cu), or combinations thereof.

12. The pre-processed wafer according to claim 8, wherein the pre-processed feature and the second layer are made of gold (Au).

13. The pre-processed wafer according to claim 12, wherein the first material is chromium (Cr), and the second material and the pre-processed feature are gold (Au).

14. The pre-processed wafer according to claim 8, wherein the second layer is from about 120 nm to about 200 nm away from the air bearing plane.

15. A pre-processed wafer having
a lapping axis, a layered axis, and a wafer axis the three axes being orthogonal to one another; and an air bearing plane, the air bearing plane being parallel to the wafer axis and perpendicular to the lapping axis and the air bearing plane bisecting the pre-processed wafer, the pre-processed wafer comprising:
at least one pre-processed feature;
at least two electrical lap guides, each of the electrical lap guides comprising:
a first layer, the first layer comprising a material having a first resistivity, the first layer having first and second contact regions for electrically connecting the electrical lap guide to electrical leads;
a second layer, the second layer comprising a material having a second resistivity,
the second layer is disposed adjacent to a portion of the first layer in the direction of the layered axis, and the second layer does not contact the air bearing plane of the electrical lap guide, and
the first layer extends farther in the lapping axis than does the second layer,
wherein the at least one pre-processed feature is disposed between the at least two electrical lap guides along the wafer axis.

16. The pre-processed wafer according to claim 15, wherein the second layer is less than about 200 nm away from the air bearing plane.

17. The pre-processed wafer according to claim 15, wherein the second layer is from about 120 nm to about 200 nm away from the air bearing plane.

* * * * *